United States Patent [19]
Sparr, Sr.

[11] 3,713,423
[45] Jan. 30, 1973

[54] UDDER AND TEAT CLEANSING APPARATUS AND SANITIZER

[76] Inventor: Anders V. Sparr, Sr., Rte. 2, Waupun, Wis. 53963

[22] Filed: Jan. 8, 1971

[21] Appl. No.: 105,037

[52] U.S. Cl. .................. 119/1, 119/158, 128/248
[51] Int. Cl. .................. A61d 11/00, A61n 11/02
[58] Field of Search .......... 119/1, 158; 128/248, 260; 401/9, 11; 15/24

[56] References Cited

UNITED STATES PATENTS

| | | | |
|---|---|---|---|
| 2,839,053 | 6/1958 | Verch et al. | 128/248 X |
| 2,952,860 | 9/1960 | George | 401/9 X |
| 3,529,577 | 9/1970 | McMenemy, Jr. | 119/158 X |
| 2,523,478 | 9/1950 | Newell | 128/248 |
| 3,288,140 | 11/1966 | McCarthy | 128/260 X |
| 3,366,111 | 1/1968 | Gandier | 128/260 |

Primary Examiner—Hugh R. Chamblee
Attorney—Clarence A. O'Brien and Harvey B. Jacobson

[57] ABSTRACT

An udder and teat washing and cleansing apparatus characterized by a teat cup dimensioned to receive and wholly enclose each selected teat. When the cup is positioned the beaded mouth thereof accommodates the teat and encompassing udder with requisite nicety for sanitizing, that is, preparatory to the milking step. The bottom of the cup has valving means including an enclosed nipple which aims the mixed solution on the opening of the teat, where infection (mastitis) usually starts. The solution in the cup is in a state of swishswashing turbulence and is suitably drained. The cup and valving means includes a trippable lever for onehanded use. The source of supply comprises a simple solution and air containing tank having requisite facilities for regulatable control.

6 Claims, 3 Drawing Figures

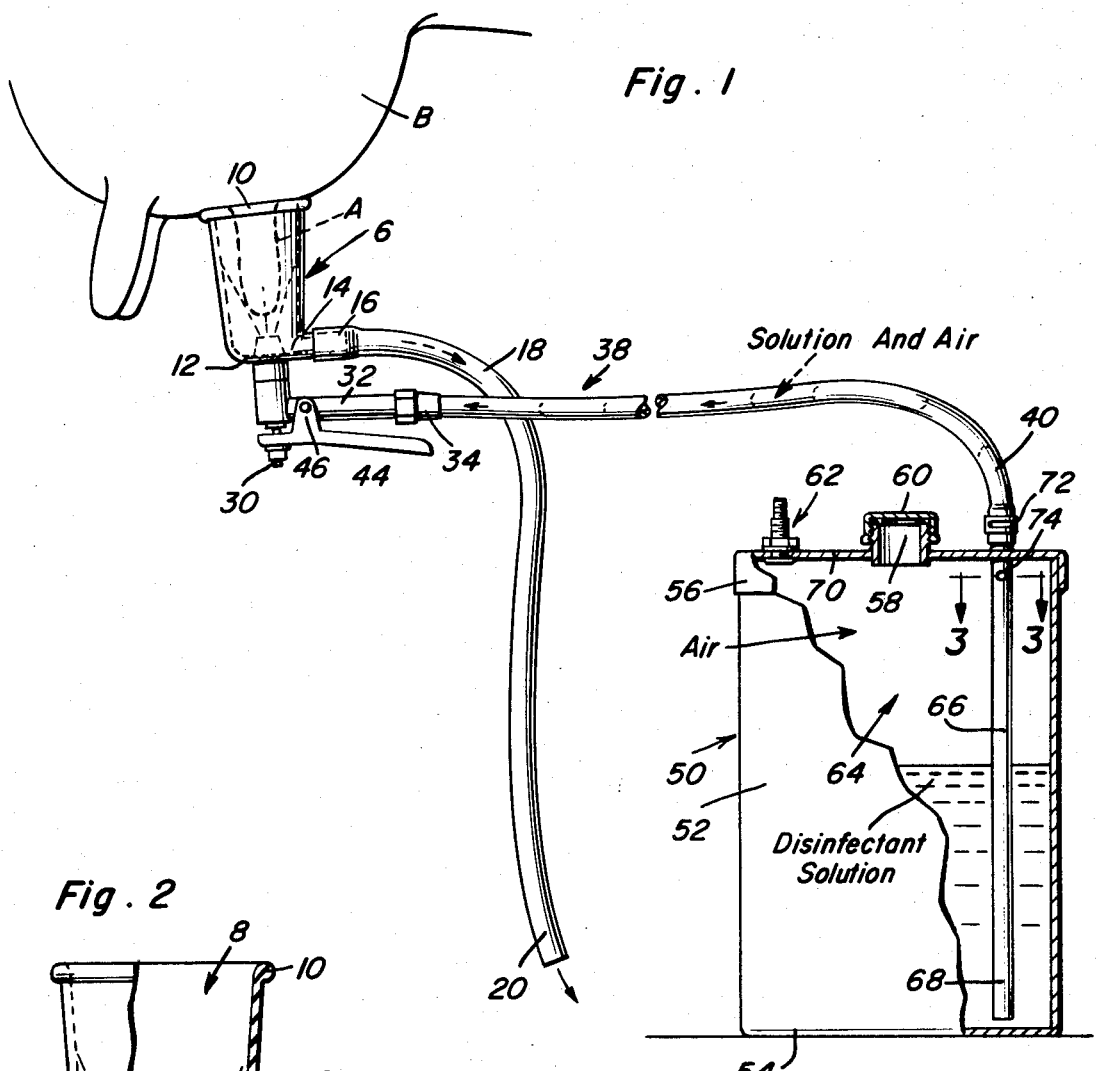
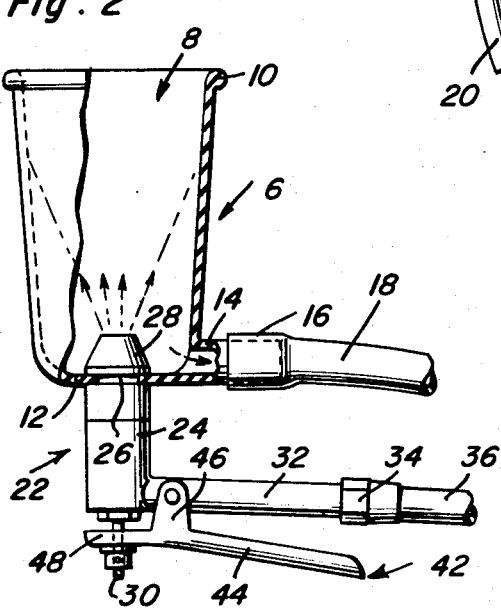
Anders V. Sparr, Sr.
INVENTOR.

UDDER AND TEAT CLEANSING APPARATUS AND SANITIZER

This invention relates to a portable teat washing, cleansing and sanitizing apparatus which is wholly mechanical, obviates the need for undependable electrical or similar power means, is manually usable, washes only one teat at a time and is characterized by a simple valved teat cup which requires but a single hand for placement and expedient use.

As is known, disease (mastitis for example) can be and often is transferred from one cow to another and is usually traceable to the use of a sponge or washcloth and a hand-carried pail containing the teat washing and cleansing solution. Milk from a cow known to be infected cannot be permissably used until it has been cleared up by required drugs and strict procedural steps. It follows that the problem thus posed has necessitated the development of certain devices and apparatuses to cope with it.

Many and varied udder and teat washing and cleansing inventions have been devised and offered for use. A primary difficulty pertains to the fact that cow udders are not uniform in size and some are 5 or 6 times larger than others. Keeping in mind that most prior art adaptations utilize a large cup, a basin-like sump, or an udder enclosing cover it is evident that prior art washers and sanitizers have not met with widespread adoption and use. With the above and many other difficulties, too numerous to set forth here, it is an object of the present invention to make available an apparatus which is such in construction and capability that it functions in a distinct and unique manner and well serves the purposes for which it has been devised.

Any number of prior patents which are generally indicative of the state of the art to which the invention relates could be cited. It will suffice for background purposes, to mention U.S. Pat. No. 1,684,047 granted to D. W. Stowen and which, generally stated, employs a relatively large cup, that is, one which envelopes the whole udder and contains enclosed perforated tubing for fluid circulating and distributing purposes. The water or other solution used is circulated by a vacuum. The same water is used over and over and can readily spread bacteria from one cow to another and desired turbulence is lacking. An analogous patent has been issued to J. C. Fitches U.S. Pat. No. 2,228,698 which is relatively complicated and is mounted on a wheel supported mobile structure and necessitates the use of a pump which is required to circulate the water and here again necessitates envelopment of the whole udder and likewise uses the same solution or water over and over. The container in a patent issued to C. E. Story U.S. Pat. No. 2,268,071 is designed for therapeutic treatment of cows and the container is strapped on the cow and also insulated for soaking for long periods of time and also has an opening for the hand to massage the udder. Hereagain, the whole udder is enveloped.

By way of differentiation and as will be hereinafter evident, the instant invention has to do with the utilization of fresh disinfectant solution for every teat and the utilizing of a spray under pressure which is aimed directly on the opening of the teat where infection usually starts. Air pressure from a simple air compressor causes turbulence in the teat receiving and washing cup. Many and other features and advantages are present in the apparatus herein presented.

Briefly, the present apparatus has to do with a plastic cup of equivalent depth and cross-sectional dimension which functions to receive and wholly enclose the teat which is to be sanitized. This cup is open at the top and contoured to appropriately and fittingly accommodate not only the depending teat but that portion of the udder immediately surrounding the teat. The bottom of the cup has first means by way of which the cup can be applied, removed and effectually handled by a single hand and by way of which a washing and disinfectant solution can be properly and satifactorily fed into the receptacle portion of the cup. This first stated means embodies a solution delivering and feeding line. The bottom is also provided with additional means, referred to as second means for draining and emptying the cup so that each teat which is acted upon is effectually and acceptably cleansed. Then, too, the overall combination includes an air and solution containing and supplying tank and a solution delivering hose line which is operatively and communicatively connected at an intake end to the tank and its outlet and feeding end to the means which delivers the spray into the bottom of the cup.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIG. 1 is a view of the overall apparatus as set up for use and showing how it is used and constructed and wherein certain component parts of the aforementioned tank are illustrated in section;

FIG. 2 is an enlarged view of parts in section and elevation detailing the cup and the component parts which are immediately associated therewith; and FIG. 3 is a cross-section on a slightly enlarged scale taken approximately on the plane of the section line 3—3 of FIG. 1 looking in the direction of the indicating arrows.

Starting with the teat cup, it will be noted in FIGS. 1 and 2 and particularly in FIG. 2 that the cup is denoted by the numeral 6 and is of requisite depth and cross-sectional dimension to accommodate a teat A on the udder B in the manner illustrated in FIG. 1. This cup has an open top or mouth portion 8 which is surrounded by an appropriate udder contacting bead 10. This beaded mouth adapts itself to requisite contact with the part of the udder immediately encompassing the teat A, as brought out in FIG. 1. The bottom of the cup is denoted (FIG. 2) by the numeral 12. It is provided on one side with a laterally projecting drainage or emptying neck 14 with which an end portion 16 of the drainage and fluid disposal hose 18 is detachably operatively connected. The discharge end of the hose is denoted at 20. In practice, this discharge end can be placed in a fluid return and trapping trough, container or gutter (not shown). This simple drainage means serves to empty the used washing and cleansing solution in a seemingly evident manner. The bottom portion of the cup is also provided with valve means which is designated, generally stated, by the numeral 22 and is characterized by an appropriate body 24 which depends below the bottom 12 and whose upper end is fashioned into a neck 26 fitting into an opening provided therefor and a truncated conical spray nipple 28, said nipple being arranged axially within the confines of the receptacle portion of the cup in order to eject the spray and to focus it upon the mouth of the teat in the manner illustrated in phantom lines in FIG. 1. This cylindrical or equivalent valve body is provided with spring loaded valve means (not detailed) but which is provided with a reciprocating plunger 30 which depends below the bottom of the valve body. It will be further noted that the valve body is provided on one peripheral side with a radially projecting stem, branch or suitably bored member 32 which delivers the disinfectant solution under pressure into the valve and by way of the valve into the receptacle portion of the cup. This branch has a coupling 34 connected thereto which inturn is carried by the discharge end portion 36 of the supply and delivery hose or line 38. The intake end of this hose or line is denoted at 40 in FIG. 1. The stem or branch 32 serves as a gripping member and carries a manually trippable lever which is denoted at 42. The lever is provided with a handle portion 44 of requisite shape and length which is opposed to the stem 32 and which has ears 46 stradling and pivotally connected to said stem. The left hand end of the lever is provided with a fork, eye or the like as at 48 which is operatively connected with the valve rod 30 for opening and closing the valve in a seemingly self-evident manner.

With reference now to the disinfectant solution containing and supply means it will be noted that this is characterized by a simple portable self-standing tank 50. The tank in practice can be of transparent material if so desired. The tank proper is denoted at 52 and has a flat bottom 54. There is a flanged cover of cap 56 on the upper end which is provided at the center with a filler neck 58 and a closing cap 60 by way of which the disinfectant solution is placed in the container portion of the tank. On one side there is a simple pneumatic tire-type valve 62 to which a hand pump (not shown) can be connected to pump air under pressure into the upper or compressed air space 64 of the tank. Diametrically opposite the valve there is a depending fluid lifting pipe which is denoted at 66 and whose lower end portion 68 terminates near the level of the bottom of the tank. The upper end portion of this pipe extends upwardly through and beyond the top wall 70 where it serves to accommodate the end portion, that is, the inlet end 40 of the aforementioned hose or conduit 38. A clamp 72 serves to connect the hose to the coacting end of the fluid lifting pipe. That portion of the pipe inwardly of the top 70 is provided with an air inlet orifice or port 74.

In practice, the tank is partially loaded with disinfectant solution as suggested in FIG. 1 and the filling step is accomplished by way of the filler neck 58. A cap 60 is supplied to close the filler neck. A hand pump, but preferably a compressed air supply hose or line is connected to the valve 62 and air is thus constantly supplied to the container space to place the solution column under pressure. When valve 22 is opened the air pressure in line 38 is reduced and the solution rises in pipe 66 and is entrained in the air entering through the opening 74 thus becoming mixed with the air and passes through hose or conduit 38 into the hollow stem 32 in readiness to enter the teat cup 60. It follows that the teat cup is placed in position in the manner suggested in FIG. 1 after which the user squeezes the handle portion 44 of the lever 42 against the stem or branch 32 thus opening the valve and permitting the mixed air and fluid to be sprayed from the nozzle 28 into the receptacle portion of the cup. When a single teat is thus washed and cleansed the valve 22 is closed and the operation is repeated on the succeeding teats on the udder B.

The size of opening 74 controls the ratio of solution and air with a smaller aperture providing a wetter spray and a larger aperture providing a very fine spray or mist. A wet spray is desired when a cleaning or disinfecting solution is used. However, when medication such as an iodine solution is used, the hole or opening 74 should be larger to provide a fine mist which will effectively treat the teat and keep the cost at a minimum. In actual practice, the iodine solution would be provided in a separate tank in which the hole 74 in pipe 66 is slightly larger. Any suitable quick connect couplings may be provided for the hose 38 and an air supply line which may be connected to valve 62 or any other suitable type of valve.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. For use on and in conjunction with a cow's udder just prior to initiating the milking step, a portable manually held and actuatable udder and teat cleansing apparatus designed and expressly capable of washing and cleansing one teat at a time comprising: a non-corrodible and washable teat cup of a depth and cross-sectional dimension to receive and wholly enclose the teat which is to be cleansed and sanitized, said cup being rigid, open at its top and contoured to fittingly accommodate not only the depending teat but that portion of the udder immediately surrounding the selected teat, the bottom of said cup having first means by way of which the cup can be applied, removed, and effectually handled by a single hand and by way of which a washing and disinfectant solution is fed into the receptacle portion of said cup, said means embodying a solution delivering and feeding line, said bottom also having second means for draining and emptying said cup, whereby each teat acted on is effectually cleansed, said first means embodying a valve mounted on and supported by the bottom of said cup, said valve having a nozzle confined to the lower part of the receptacle portion of said cup in a manner to focus the stream of solution upon the mouth of the teat which is being acted on, a major part of the said valve having a body portion depending below an axial portion of the bottom of said cup and being provided on one side with a radially projecting branch for communicative connection thereto of a solution delivering hose, said body having normally closed valving means therein, and a valve actuating lever pivotally mounted intermediate its ends on said hose connecting branch and having one end operatively joined with the valving means and its other end fashioned into a handle which is proximal to and parallel with said branch to facilitate simultaneously catching hold of said handle and branch for conveniently handling of the overall apparatus.

2. The udder and teat cleansing apparatus defined in and according to claim 1, and, in combination, an air and solution containing and supplying tank, and a solution delivering hose line operatively and communicatively connected at an intake end to said tank and at its outlet and feeding end to said first means.

3. The udder and teat cleansing apparatus defined in and according to claim 2, and wherein said tank is portable, self-standing when in use and is provided with a capped filler neck, an air supplying and receiving means, and also with an internal solution elevating pipe, said pipe having a lower end spaced just above the level of said bottom of the tank and having an upper portion confined within the container space of the tank provided with a restricted compressed air intake orifice, the extreme upper end of said pipe extending through a top wall of the tank, and the intake end of said hose line being operatively and communicatively joined to said upper end.

4. A portable udder and teat cleansing apparatus which is expressly designed and capable of washing and cleansing one teat at a time comprising a non-corrodible washable teat cup of a depth and cross-sectional dimension to receive and wholly enclose the teat which is to be cleansed and sanitized, said cup having an open upper end encompassed by an encircling bead and providing a mouth to facilitate placement and retention of the cup when being used, a valve connected to the axial portion of the bottom of the cup, said valve having a body portion depending below the bottom and having a truncated conical nozzle in the receptacle portion of the cup in a position to aim the spray against the enclosed teat, said cup being provided on one side with a discharge neck, a drainage hose connected to said neck, said valve body being provided on one side with a hollow stem, a lever pivotally mounted on said stem and having a handle portion cooperable with and squeezeable toward and from the stem, said lever having operating connection with valve means which can be opened and closed at will, a tank adapted to contain a given supply of disinfectant solution, said tank being provided with a fluid elevating pipe extending from a point adjacent the bottom to and through the top of the tank, a hose having one end connected to the upper end of said pipe and the other end connected to the aforementioned stem, the top of said tank being provided with a capped filler neck and means which is capable of supplying pressurized air to the tank, the upper enclosed inner end of said lifting pipe being provided with an air inlet orifice.

5. The structure defined in claim 4 wherein said air inlet orifice is calibrated to determine the ratio of air and solution thereby enabling the use of a smaller orifice to produce a wet spray for cleaning and disinfectant solutions and a larger orifice to produce a fine mist for a medicating solution.

6. A portable, manually applicable and removable under and teat cleansing apparatus which is expressly designed and capable of washing and cleansing one teat at a time comprising: a non-corrodible washable teat cup of a depth and cross-sectional dimension to receive and wholly enclose the teat which is to be cleansed and sanitized, said cup having an open upper end providing a mouth to facilitate placement and retention of the cup when it is being held up in place and used, a valve connected to the axial portion of the bottom of said cup, said valve having a body portion depending below the bottom of said cup and having upper terminal end portion embodying a truncated conical nozzle located and confined in the bottom of the receptacle portion of said cup in a position to properly aim the spray against the aligned tip of the enclosed teat, said bottom portion of said cup being exteriorly provided on one side with a discharge neck, a drainage hose communicatively connected to said neck, said valve body being provided on one side with a rigid hollow stem, said stem being situated directly beneath, spaced from and parallel with said discharge neck, a lever having one end portion pivotally mounted on and carried by said stem and having a handle portion which is located adjacent to, parallel with and also cooperable with as well as squeezeable toward and from said stem, said lever having operating connection with said valve whereby said valve can be opened and closed at will.

* * * * *